United States Patent
Caiado de Lamare et al.

(10) Patent No.: US 7,680,266 B2
(45) Date of Patent: Mar. 16, 2010

(54) SYSTEM AND METHOD FOR ADAPTIVE REDUCED-RANK PARAMETER ESTIMATION USING AN ADAPTIVE DECIMATION AND INTERPOLATION SCHEME

(76) Inventors: Rodrigo Caiado de Lamare, Rua Barão da Torre, 496 Cobertura, Ipanema, 22411-002-RJ (BR); Raimundo Sampaio-Neto, Rua Nascimento Silva, 7, Apt. 802, Ipanema, 22421-020-RJ (BR)

( * ) Notice: Subject to any disclaimer, the term of this patent is extended or adjusted under 35 U.S.C. 154(b) by 930 days.

(21) Appl. No.: 11/427,471

(22) Filed: Jun. 29, 2006

(65) Prior Publication Data
US 2008/0040037 A1  Feb. 14, 2008

(51) Int. Cl.
*H04M 9/08* (2006.01)
(52) U.S. Cl. .................. 379/416; 379/406.01; 708/313
(58) Field of Classification Search ............ 379/406.01, 379/406.06; 708/290, 313
See application file for complete search history.

(56) References Cited

U.S. PATENT DOCUMENTS
5,130,952 A * 7/1992 Feintuch et al. ............. 367/135
* cited by examiner

*Primary Examiner*—Walter F Briney, III
(74) *Attorney, Agent, or Firm*—Alston & Bird LLP

(57) ABSTRACT

The present invention describes a system and method for general parameter estimation using adaptive processing that provides a performance that significantly exceeds existing reduced-rank schemes using reduced computational resources with greater flexibility. The adaptive processing is accomplished by calculating a reduced-rank approximation of an observation data vector using an adaptive decimation and interpolation scheme. The new scheme employs a time-varying interpolator finite impulse response (FIR) filter at the front-end followed by a decimation structure that processes the data according to the decimation pattern that minimizes the squared norm of the error signal and by a reduced-rank FIR filter. According to the present invention, the number of elements for estimation is substantially reduced, resulting in considerable computational savings and very fast convergence performance for tracking dynamic signals. The current invention is aimed at communications and signal processing applications such as equalization, interference suppression of CDMA systems, echo cancellation and beamforming with antenna arrays. Amongst other promising areas for the deployment of the present technique, we also envisage biomedical engineering, control systems, radar and sonar, seismology, remote sensing and instrumentation.

11 Claims, 2 Drawing Sheets

SYSTEM AND METHOD FOR ADAPTIVE REDUCED-RANK PARAMETER ESTIMATION USING AN ADAPTIVE DECIMATION AND INTERPOLATION SCHEME

BACKGROUND OF THE INVENTION

1. Field of the Invention

The present invention relates to a system and method for improving the performance of estimation techniques and for reducing the number of elements required for this estimation task when dealing with general purpose signals that are embedded in interference.

2. Discussion of the Related Art

Several signals processing techniques have been developed to process signals and estimate parameters of interest based on the knowledge of a reference signal. Efforts are generally made to reduce or suppress the interference received with the signal and this interference can be of various types such as noise, jamming and other users. When these signals possess a large bandwidth and require a large number of elements for estimation, the signal processing task becomes rather challenging.

Adaptive signal processing is particular technique designed to model, extract and track signals by weighting a set of discrete-time signals from a source, which can be an antenna or a general electronic equipment, in order to perform a desired task.

To compute the adaptive weights, these techniques typically combine several samples over a period of time. Generally, adaptive weights are calculated through the relationship $Rw=p$, where p is the steering vector with M coefficients, R is M×M the covariance matrix, and w is the weight vector with M elements. In order to identify the adaptive weights this relationship is simply manipulated to the following: $w=R^{-1}p$. This equation requires a number of arithmetic operations that is proportional to $M^3$, which is too complex for practical use.

In this context, existing adaptive signal processing techniques such as transversal linear filters with the least-mean square (LMS) algorithm are simple, have low complexity but usually have poor convergence performance. In contrast, adaptive filters with recursive least-squares (RLS) algorithms have fast convergence but require a significantly higher complexity than LMS recursions. Several attempts to provide cost-effective parameter estimators with fast convergence performance have been made in the last few decades through variable step size algorithms, data-reusing, averaging methods, sub-band and frequency-domain adaptive filters and RLS types algorithms with linear complexity such as lattice-based implementations, fast RLS algorithms, QR-decomposition-based RLS techniques and the more recent and promising reduced-rank adaptive filters.

The advantages of reduced-rank adaptive filters are their faster convergence speed and better tracking performance over existing techniques when dealing with large number of weights. Various reduced-rank methods and systems were based on principal components analysis, in which a computationally expensive singular value decomposition (SVD) to extract the signal subspace is required. Other recent techniques such as the multistage Wiener filter (MWF) of Goldstein et al. in "A multistage representation of the Wiener filter based on orthogonal projections", IEEE Transactions of Information Theory, vol. 44, November, 1998—perform orthogonal decompositions in order to compute its parameters, leading to very good performance and a complexity inferior to those systems that require poor performance in systems with moderate to heavy loads.

In most applications, the process of calculating and altering the weights must be done in real-time. Because modern applications involve a large number of adaptive parameters and operate in non-stationary environments, the system requires a large amount of data to compute the estimates. However, in most practical situations the amount of data available is simply insufficient to provide accurate estimates. In addition, when a parameter estimator with a large number of weights is required to track a dynamic signal embedded in interference, it encounters difficulties in following the signal of interest and may fall or show unsatisfactory performance.

These and other deficiencies exist in current adaptive processing systems in the open literature and amongst the patented techniques so far. Therefore, a solution to these problems is needed providing a reduced rank adaptive processing system and method specifically designed to more accurately estimate and track signals that involve a large number of processing elements with low complexity and great flexibility.

BRIEF DESCRIPTION OF THE FIGURES

For a better understanding of the present invention, reference may be made to the accompanying figures.

DETAILED DESCRIPTION OF THE PRESENT INVENTION

The present invention relates to a reduced-rank parameter estimator system and method for processing discretely represented data based on a novel adaptive interpolation and decimation scheme that is simple, flexible, and provides a remarkable performance advantage over existing techniques. The new scheme employs a time-varying interpolator FIR filter at the front-end followed by a decimation structure that processes the data according to the decimation pattern that minimizes the squared norm of the error signal between the desired estimate and the estimate provided by a reduced-rank filter. In the new scheme, the number of elements for estimation is substantially reduced, resulting in considerable computational savings and very fast convergence performance for tracking dynamic signals. Minimum mean squared error (MMSE) design filters for both interpolator and reduced-rank estimators is described and it is proposed alternative decimation structures for the proposed scheme. With respect to the decimation structures the invention defines the optimal decimation scheme that represents a combinatorial problem with all possible decimation patterns for a chosen decimation factor L and two sub-optimal decimation structures that are based on random and pre-stored patterns, respectively. In order to further reduce the computational burden for parameter estimation, it is illustrated how standard low complexity LMS and RLS algorithms can be used in conjunction with the presented reduced-rank structure. The present invention is med at communications and signal processing applications such as equalization, interference suppression for CDMA systems, echo cancellation and beamforming with antenna arrays. Amongst other promising areas for the deployment of the present technique, it is also envisaged biomedical engineering, control systems, radar and sonar, seismology, remote sensing and instrumentation.

1. Reduced-Rank MMSE Filtering with Adaptive Interpolation and Decimation

Figure 1:
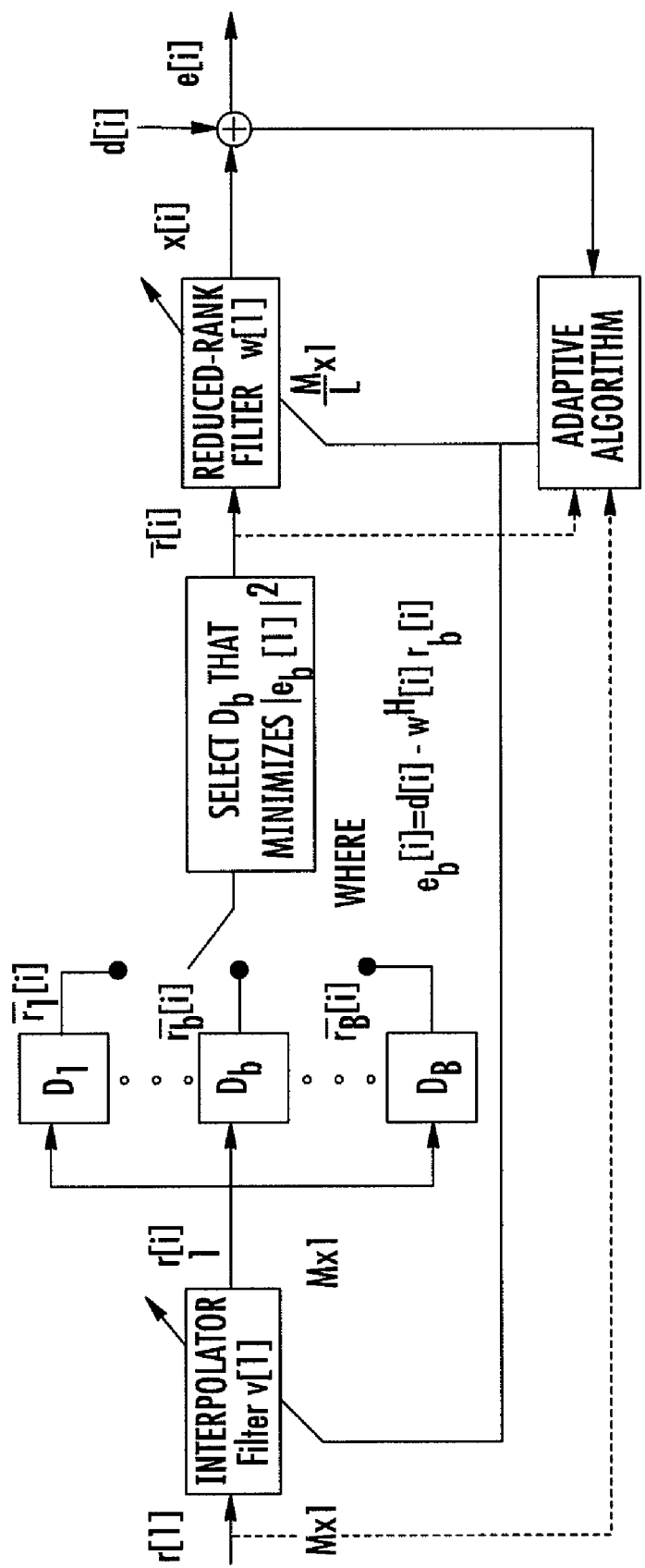
FIG. 1 depicts the proposed adaptive reduced-rank filter structure with adaptive decimation and interpolation.

The framework of the proposed adaptive reduced-rank MMSE filtering scheme and method is detailed in this section. FIG. 1 shows the structure of the adaptive processor, where an interpolator, a decimator unit and a reduced-rank receiver that are time-varying are employed. The M×1 received vector $r(i)=[r_0^{(i)} \ldots r_{M-1}^{(i)}]^T$ is filtered by the interpolator filter $v(i)=[v_0^{(i)} \ldots v_{N_I-1}^{(i)}]^T$, yielding the interpolated received vector $r_I(i)$, which is then decimated by several decimation patterns in parallel, leading to B different M/L×1-dimensional vectors $r_b(i)$. The novel decimation procedure corresponds to discard M−M/L samples of $r_I(i)$ of each set of M received samples with different discarding patterns, resulting in B different decimated vectors $r_b(i)$ with reduced dimension M/L and then computing the inner product of $r_b(i)$ with the M/L-dimensional vector of the reduced-rank filter coefficients $w(i)=[w_0^{(i)} \ldots w_{M/L}^{(i)}]^T$ that minimizes the squared norm of the error signal.

2. Adaptive Interpolation and Decimation Structure

The front-end adaptive filtering operation is carried out by the interpolator filter $v(i)$ on the received vector $r(i)$ and yields the interpolated received vector $r_I(i)=V^H(i)r(i)$, where the M×M convolution matrix $V(i)$ with the coefficients of the interpolator is given by $$V(i) = \begin{bmatrix} v_0^{(i)} & \ldots & v_{N_I-1}^{(i)} & 0 & \ldots & 0 \\ \vdots & \vdots & \vdots & \ddots & \ddots & \vdots \\ 0 & \ldots & 0 & v_0^{(i)} & \ldots & v_{N_I-1}^{(i)} \end{bmatrix} \quad (1)$$

An alternative way of expressing the interpolated received vector $r_I(i)$ is now introduced that will be useful when dealing with the different decimation patterns, through the following equivalence:

$$r_I(i) = V^H(i)r(i) = \underline{\mathfrak{R}}_o(i)v^*(i) \quad (2)$$

where the M×N$_I$ matrix with the received samples of $r(i)$ and that implements convolution is described by $$\underline{\mathfrak{R}}_o(i) = \begin{bmatrix} r_0^{(i)} & r_1^{(i)} & \ldots & r_{N_I-1}^{(i)} \\ r_1^{(i)} & r_2^{(i)} & \ldots & r_{N_I}^{(i)} \\ \vdots & \vdots & \ddots & \vdots \\ r_{M-1}^{(i)} & r_M^{(i)} & \ldots & r_{M+N_I}^{(i)} \end{bmatrix} \quad (3)$$

The decimated interpolated observation vector $\bar{r}_b(i)=D_b r_I(i)$ for branch b is obtained with the aid of the M/L×M decimation matrix $D_b$ that adaptively minimizes the squared norm of the error at time instant i. The matrix $D_b$ is mathematically equivalent to signal decimation with a chosen pattern on the M×1 vector $r_I(i)$, which corresponds to the removal of M−M/L samples of $r_I(i)$ of each set of M observed samples. An interpolated and decimation scheme with uniform decimation pattern $D_b^U$ and with decimation factor L can be designed by choosing the number of branches B=1 and the structure:

$$D_b^U = \begin{bmatrix} 1 & 0 & 0 & 0 & 0 & \ldots & 0 & 0 & 0 & 0 & 0 \\ \vdots & \vdots & \vdots & \vdots & \vdots & \vdots & \vdots & \vdots & \vdots & \vdots & \vdots \\ 0 & \ldots & 0 & 1 & 0 & \ldots & 0 & 0 & 0 & 0 & 0 \\ \underbrace{\phantom{0 \ldots 0}}_{(m-1)L\,zeros} & & & & & & & & & & \\ 0 & 0 & 0 & 0 & 0 & \ldots & 0 & 1 & 0 & \ldots & 0 \\ \underbrace{\phantom{0 \ldots 0}}_{(M/L-1)L\,zeros} & & & & & & & \underbrace{\phantom{0 \ldots 0}}_{L-1\,zeros} & & & \end{bmatrix} \quad (4)$$

where m (m=1, 2, . . . , M/L) denotes the m-th row. The uniform decimation pattern corresponds to the use of a single branch on the decimation unit. However, it is possible to exploit the processed samples through a more elegant and effective way with the deployment of several branches in parallel. Specifically, the next subsection will present alternatives for designing the decimation unit that can yield a remarkable performance and allow the deployment of large decimation factors L.

3. Adaptive Decimation Schemes

Figures 2A, 2B, 2C:
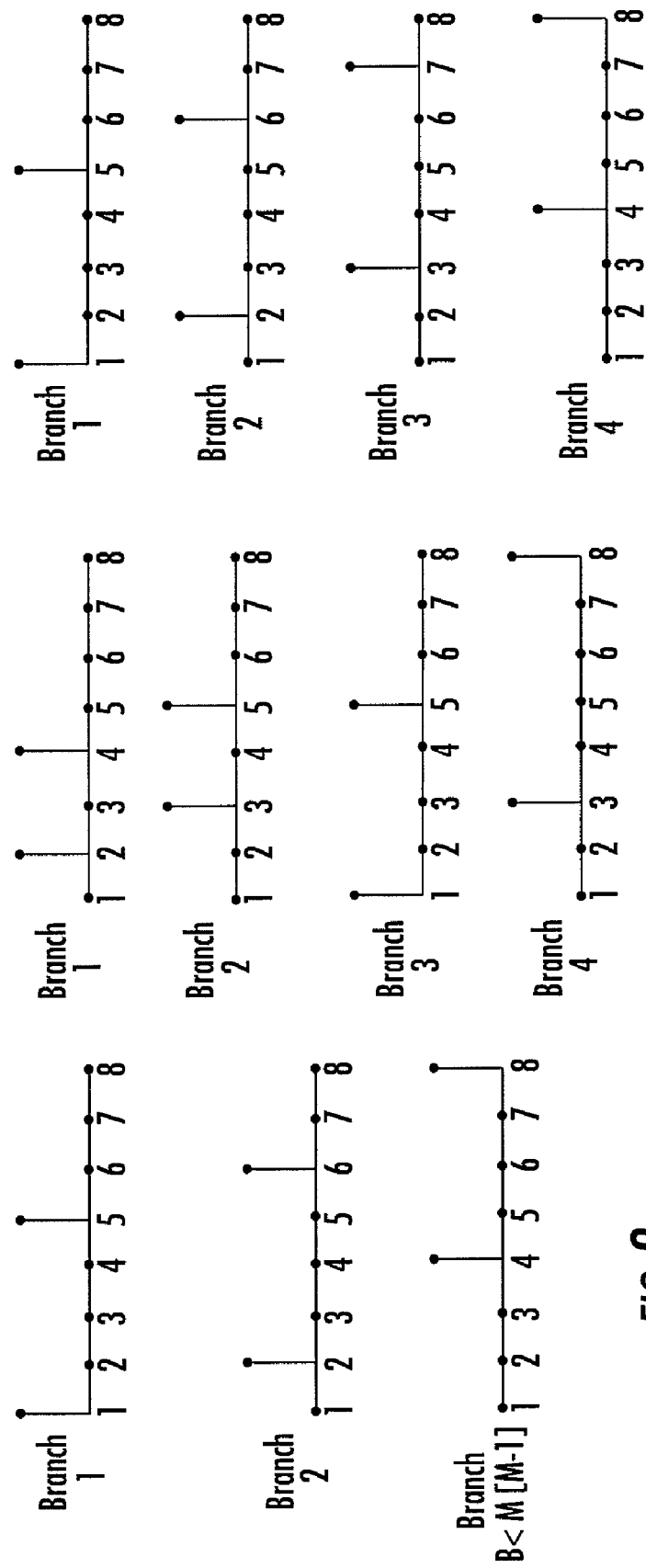
FIG. 2 illustrates the process of sample selection of the three proposed adaptive decimation schemes for a system with M=8 samples, and decimation factor L=4 with B=4 branches where (a) is the optimal decimation procedure; (b) is the random decimation; and (c) is the pre-stored uniform decimation patterns.

In this subsection, it is proposed three alternatives for designing the decimation unit of the novel reduced-rank scheme, where the common framework is the use of parallel branches with decimation patterns that yield B decimated vectors $\bar{r}_b(i)$ as candidates. The first structure corresponds to the optimal decimation procedure for a given decimation factor L that seeks the solution to the decimation problem that adaptively minimizes the square norm of the error. The second approach is a suboptimal one that utilizes random decimation patterns, whereas the third scheme employs pre-stored patterns in lieu of the random ones. A graphical illustration of the three proposed decimation patterns is shown in FIG. 2, considering small M=8, L=4 and B=4 for simplicity and with the aim of clearly explaining the adaptive decimation process.

Mathematically, the signal selection scheme chooses the decimation pattern $D_b$ and consequently the decimated interpolated observation vector $\bar{r}_b(i)$ that minimize $|e_b(i)|^2$, where $e_b(i)=d(i)-w^H(i)\bar{r}_b(i)=w^H(i)D_b r_I(i)$ is the error signal at branch b. Once the decimation pattern is selected for the time instant i, the decimated interpolated vector is computed as follows $\bar{r}(i)=D(i)r_I(i)$. The decimation pattern $D(i)$ is selected on the basis of the following criterion:

$$D(i) = \arg \min_{1 \leq b \leq B} |e_b(i)|^2 \quad (5)$$

where the optimal decimation pattern $D_{opt}$ for the proposed scheme with decimation factor L is derived through the counting principle, where it is considered a procedure that has M samples as possible candidates for the first row of $D_{opt}$ and M−m samples as candidates for the following M/L−1 rows of $D_{opt}$, where m denotes the m-th row of the matrix $D_{opt}$, resulting in a number of candidates equal to $$B = \underbrace{M(M-1)(M-2)\ldots(M-M/L-1)}_{M/L\,terms} = \frac{M!}{(M-M/L)!} \quad (6)$$

The optimal decimation scheme described in (5)-(6) is, however, very complex for practical use because it requires the M/L permutation of M samples for each symbol interval and carries out an extensive search over all possible patterns.

Therefore, a decimation scheme that renders itself to practical and low complexity implementations is of great significance and interest in this context.

The second decimation scheme that it is presented in this subsection is a suboptimal approach that is based on a finite number of parallel branches with random decimation patterns $D_b^R$, where $1 \leq b \leq B$ and whose structure is described by $$D_b^R = \begin{bmatrix} \underbrace{0 \ldots 0}_{r_1 zeros} & 1 & 0 & \ldots & 0 & 0 & 0 & 0 & 0 \\ \vdots & \vdots & \vdots & \vdots & \vdots & \vdots & \vdots & \vdots & \vdots & \vdots \\ \underbrace{0 \ldots 0}_{r_m zeros} & 1 & 0 & \ldots & 0 & 0 & 0 & 0 & 0 \\ 0 & 0 & 0 & 0 & \ldots & 0 & 1 & \underbrace{0 \ldots 0}_{(M-\frac{r_M}{L}-1)zeros} \\ & \underbrace{\phantom{xxxx}}_{\frac{r_M}{L} zeros} & & & & & & \end{bmatrix} \quad (7)$$

where $m(m=1, 2, \ldots, M/L)$ denotes the m-th row and $r_m$ is a discrete uniform random variable, which is independent for each row m and whose values range between 0 and M−1. The disadvantage of the above decimation pattern is that it requires the use of a discrete uniform random generator for producing the B decimation patterns which are employed in parallel. In this regard, the $r_m$ does not have to be necessarily changed for each time instant i, but it can be used for the whole set of data.

The third decimation scheme that it is introduced in this invention is a suboptimal structure that employs B pre-stored decimation patterns whose structure is given by $$D_b^U = \begin{bmatrix} \underbrace{0 \ldots 0}_{(b-1) zeros} & 1 & 0 & \ldots & 0 & 0 & 0 & 0 & 0 \\ \vdots & \vdots & \vdots & \vdots & \vdots & \vdots & \vdots & \vdots & \vdots & \vdots \\ \underbrace{0 \; 0 \; 0 \; \ldots \; 0}_{(m-1)L+(b-1) zeros} & 0 & 1 & 0 & 0 & 0 & 0 \\ \underbrace{0 \; 0 \; 0 \; 0 \; 0 \; \ldots}_{(M/L-1)L+(b-1) zeros} & 0 & 1 & \underbrace{0 \ldots 0}_{(L-1)-(b-1) zeros} \end{bmatrix} \quad (8)$$

where in the above structure the designer utilizes uniform decimation for each branch b and the different patterns are obtained by picking up adjacent samples with respect to the previous and succeeding decimation patterns. In fact, the proposed decimation structure corresponds to a uniform scheme whose index of samples chosen at each row m is shifted by one position for each branch b. The great advantage of the above decimation pattern is that it is very simple and can be easily implemented by digital signal processors since it is constituted by sliding patterns in parallel. It should be remarked that other suboptimal decimation structures have been tested even though the schemes described here, namely, the random structure $D_b^R$ and the pre-stored one $D_b^S$ have shown the best results and are able to approach the performance of the optimal scheme $D_{opt}$.

4. MMSE Reduced-Rank Scheme Filter Design

In this subsection, it is defined the MMSE filter design of the proposed reduced-rank structure. The strategy, that allows solutions devise for both interpolator and receiver, is to express the estimated symbol $x(i)=w^H(i)\bar{r}(i)$ as a function of $w(i)$ and $v(i)$:

$$\begin{aligned} x(i) &= w^H(i)\bar{r}(i) = w^H(i)(D(i)r_I(i)) = w^H(i)(D(i)V(i)r(i)) \\ &= w^H(i)(D(i)\mathfrak{R}_o(i)v^*(i)) = w^H(i)(D(i)\mathfrak{R}_o(i))v^*(i) \\ &= w^H(i)\mathfrak{R}(i)v^*(i) \\ &= v^H(i)(\mathfrak{R}^T(i)w^*(i)) = v^H(i)u(i) \end{aligned} \quad (9)$$

where $u(i)=\mathfrak{R}^T(i)w^*(i)$ is an $N_f \times 1$ vector, the M/L coefficients of $w(i)$ and the $N_f$ elements of $v(i)$ are assumed to be complex and the M/L×$N_f$ matrix $\mathfrak{R}(i)$ is given by $\mathfrak{R}(i)=D(i)\mathfrak{R}_o(i)$.

The MMSE solution for $w(i)$ and $v(i)$ can be computed if it is considered the optimization problem whose cost function is expressed by $$J_{MSE}(w(i),v(i))=E[|d(i)-v^H(i)\mathfrak{R}^T(i)w^*(i)|^2] \quad (10)$$

where $d(i)$ is the desired symbol at time index (i). By fixing the interpolator $v(i)$ and minimizing (10) with respect to $w(i)$ the interpolated Wiener filter weight vector is $$w(i)=\alpha(v)=\bar{R}^{-1}(i)\bar{p}(i) \quad (11)$$

where $\bar{R}(i)=E[\bar{r}(i)\bar{r}^H(i)]$, $\bar{p}(i)=E[d^*(i)\bar{r}(i)]$, $\bar{r}(i)=\mathfrak{R}^T(i)v^*(i)$ and by fixing $w(i)$ and minimizing (10) with respect to $v(i)$ the interpolator weight vector is $$v(i)=\beta(w)=\bar{R}_u^{-1}(i)\bar{p}_u(i) \quad (12)$$

where $\bar{R}_u(i)=E[u(i)u^H(i)]$, $\bar{p}_u(i)=E[d^*(i)u(i)]$ and $u(i)=\mathfrak{R}^T(i)w^*(i)$. The associated MSE expression are $$J(v)=J_{MSE}(v,\alpha(v))=\sigma_d^2-\bar{p}^H(i)\bar{R}^{-1}(i)\bar{p}(i) \quad (13)$$

$$J_{MSE}(w,\beta(w))=\sigma_d^2-\bar{p}_u^H(i)\bar{R}_u^{-1}(i)\bar{p}_u(i) \quad (14)$$

where $\sigma_d^2=E[|d(i)|^2]$. Note that points of global minimum of (10) can be obtained by $$v_{opt} = \arg\min_v J(v) \text{ and}$$

$$w_{opt} = \alpha(v_{opt}) \text{ or}$$

$$w_{opt} = \arg\min_w J_{MSE}(w, \beta(w)) \text{ and}$$

$$v_{opt} = \beta(w_{opt}).$$

At the minimum point (13) equals (14) and the MMSE for the proposed structure is achieved. It is important to remark that (11) and (12) are not closed-form solutions for $w(i)$ and $v(i)$ since (11) is a function of $v(i)$ and (12) depends on $w(i)$ and thus it is necessary to iterate (11) and (12) with an initial guess to obtain a solution. A pseudo-code for the batch iterative algorithm is shown in Table I. An alternative iterative MMSE solution can be seek via adaptive algorithms and is discussed in the next section.

TABLE I

Batch iterative algorithm for the design of proposed reduced-rank filtering scheme.

Algorithm 1:

Initialize $w(0) = [0 \ldots 0]^T$ end $v(0) = [1\ 0 \ldots 0]^T$
Choose parameters B and L
for each time instant (i) do
Compute M × 1 vector $r_I(i) = V^H(i)r(i) = \mathfrak{R}_o(i)v^*(i)$
Obtain M/L × 1 vectors $\bar{r}_b(i) = D_b r_I(i)$ for the B branches TABLE I-continued Batch iterative algorithm for the design of proposed reduced-rank filtering scheme.

Algorithm 1:

Select $D_b$ that minimizes $|e_b(i)|^2$ ($D_b$ becomes $D(i)$)
Obtain $\bar{r}(i)$ and compute estimate of $\bar{R}(i)$ and $\bar{p}(i)$ $$\left( \text{Ex: } \hat{\bar{R}}(i) = \sum_{j=1}^{i} \lambda^{i-j} \bar{r}(j) \bar{r}^H(j) \text{ and } \hat{\bar{p}}(i) = \sum_{j=1}^{i} \lambda^{i-j} d^*(i) \bar{r}(j) \right)$$

Obtain $u(i) = \Re^T(i) w^*(i)$ and compute estimates of $\bar{R}_u(i)$ and $\bar{p}_u(i)$ Compute $v(i) = \hat{\bar{R}}_u^{-1}(i) \hat{\bar{p}}_u(i)$ and $w(i) = \hat{\bar{R}}^{-1}(i) \hat{\bar{p}}(i)$ Reduced-rank sample estimate: $\hat{d}(i) = w^H(i) r(i)$ It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

5. Adaptive Algorithms

Here it is described alternative forms of computing the parameters of the invented system and method. This estimation procedure is accomplished by standard LMS and RLS algorithms commonly found in the literature that are slightly modified in order to account for the joint optimization of both interpolator and reduced-rank filters. These algorithms are used to adjust the parameters of the reduced-rank and the interpolator filters based on the minimum squared error (MSE) criterion and select the decimation pattern that minimizes the squared norm of the error signal and require fewer computational resources than the batch approach described in Table I. The novel system and method, shown in FIG. 1, gathers fast convergence, low complexity and additional flexibility since the designer can adjust the decimation factor L and the length of the interpolator $N_I$ depending on the needs of the application and the hostility of the environment.

5. 1. Least Means Squares (LMS) Algorithm for the Proposed Scheme

Let's consider the observation vector $r(i)$ and the adaptive processing carried out by the proposed scheme, as in FIG. 1. With the aid of the convolution matrix in (1), it is computed the M×1 interpolated observation vector $r_I(i)$ and then computed the decimated interpolated observation vectors $\bar{r}_b(i)$ for the B branches with the aid of the decimation patterns $D_b$, where $1 \leq b \leq B$. Once the B candidate vectors $\bar{r}_b(i)$ are computed, it is selected the vector $\bar{r}_b(i)$ that minimizes the squared norm of $$e_b(i) = d(i) - w^H(i) \bar{r}_b(i) \quad (15)$$

Based on the signal selection that minimizes $|e_b(i)|^2$, the corresponding reduced-rank observation vector $\bar{r}(i)$ is chosen and the error of the proposed LMS algorithm $e(i)$ is selected as the error $e_b(i)$ with smallest squared magnitude of the B branches $$e(i) = \arg \min_{1 \leq b \leq B} |e_b(i)|^2 \quad (16)$$

Given the reduced-rank observation vector $\bar{r}(i)$ and the desired signal $d(i)$, the following cost function is done as:

$$J_{MSE}(w(i), v(i)) = |d(i) - v^H(i) \Re^T(i) w^*(i)|^2 \quad (17)$$

Taking the gradient terms of (17) with respect to $v(i)$, $w(i)$ and using the gradient descent $$w(i+1) = w(i) - \mu \frac{\partial J_{MSE}(w(i), v(i))}{\partial w^*} \text{ and}$$

$$v(i+1) = v(i) - \eta \frac{\partial J_{MSE}(w(i), v(i))}{\partial v^*} \text{ yields:}$$

$$v(i+1) = v(i) + \eta e^*(i) u(i) \quad (18)$$

$$w(i+1) = w(i) + \mu e^*(i) r(i) \quad (19)$$

where $e(i) = d(i) - w^H(i) \bar{r}(i)$, $u(i) = \Re^T(i) w^*(i)$, $\mu$ and $\eta$ are the step sizes of the algorithm for $w(i)$ and $v(i)$. The LMS algorithm for the proposed structure described in this section has a computational complexity $O(M/L + N_I)$. In fact, the proposed structure trades off one LMS algorithm with complexity $O(M)$ against two LMS algorithms with complexity $O(M/L)$ and $O(N_I)$, operating in parallel. It is worth noting that, for stability and to facilitate tuning of parameters, it is useful to employ normalized step sizes and consequently NLMS type recursions when operating in a changing environment and thus have $\mu(i) = \mu_O/(r^H(i) r(i))$ and $\eta(i) = \eta_O/(u^H(i) u(i))$ as the step sizes of the algorithm for $w(i)$ and $v(i)$, where $\mu_O$ and $\eta_O$ are their respective convergence factors.

TABLE 2

LMS iterative algorithm for the design of proposed reduced-rank filtering scheme.
Algorithm II:

Initialize $w(0) = [0 \ldots 0]^T$ and $v(0) = [1 \, 0 \ldots 0]^T$
Choose parameters B, L and step sizes $\mu$ and $\eta$
for each time instant (i) do
Compute M × 1 vector $r_I(i) = V^H(i) r(i) = \Re_o(i) v^*(i)$
Obtain M/L × 1 vectors $\bar{r}_b(i) = D_b r_I(i)$ for the B branches
Select $D_b$ that minimizes $|e_b(i)|^2$ ($D_b$ becomes $D(i)$)
Obtain $\bar{r}(i)$, $u(i)$ and compute $v(i+1) = v(i) + \eta e^*(i) u(i)$ and $w(i+1) = w(i) + \mu e^*(i) r(i)$
Reduced-rank sample estimate: $\hat{d}(i) = w^H(i) r(i)$ 5. 2. Recursive Least Squares (RLS) Algorithm for the Proposed Scheme Now let's consider again the observation vector $r(i)$ and the adaptive processing carried out by the proposed scheme, as depicted in FIG. 1. It is computed the M×1 interpolated observation vector $r_I(i)$ with the aid of $V(i)$ and then the decimated interpolated observation vectors $r_b(i)$ is computed, for the B branches with the decimation patterns $D_b$, where $1 \leq b \leq B$. Unlike the LMS algorithms presented in the preceding subsection, the vector $\bar{r}_b(i)$ that minimizes the squared norm is chosen of the posteriori error $$\zeta_b(i) = d(i) - w^H(i) \bar{r}_b(i) \quad (20)$$

Based on the signal selection that minimizes $|\zeta_b(i)|^2$, it is chosen the corresponding reduced-rank observation vector $\bar{r}(i)$ and it is selected the error of the proposed iterative RLS algorithm $\zeta(i)$ as the error $\zeta_b(i)$ with smallest squared magnitude of the B branches $$\zeta(i) = \arg\min_{1 \leq b \leq B} |\zeta_b(i)|^2 \quad (21)$$

In order to compute parameter estimates, it is considered the time average estimate of the matrix $\bar{R}(i)$, required in (11), given by $$\hat{\bar{R}}(i) = \sum_{j=1}^{i} \lambda^{i-j} \bar{r}(j) \bar{r}^H(j),$$

where $\lambda(0<\lambda\leq 1)$ is the forgetting factor, that can be alternatively expressed by $$\hat{\bar{R}}(i) = \lambda \hat{\bar{R}}(i-1) + \bar{r}(i)\bar{r}^H(i).$$

To avoid the inversion of $$\hat{\bar{R}}(i)$$

required in (11), the matrix inversion lemma is used and it is define $$P(i) = \hat{\bar{R}}^{-1}(i)$$

and the gain vector G(i) as $$G(i) = \frac{\lambda^{-1} P(i-1)\bar{r}(i)}{1 + \lambda^{-1} \bar{r}^H(i) P(i-1)\bar{r}(i)} \quad (22)$$

and thus P(i) can be rewritten as $$P(i) = \lambda^{-1} P(i-1) - \lambda^{-1} G(i) \bar{r}^H(i) P(i-1) \quad (23)$$

By rearranging (23), $G(i) = \lambda^{-1} P(i-1)\bar{r}(i) - \lambda^{-1} G(i)\bar{r}^H(i) P(i-1)\bar{r}(i) = P(i)\bar{r}(i)$. By employing the LS solution (a time average of (11)) and the recursion $$\hat{\bar{p}}(i) = \lambda \hat{\bar{p}}(i-1) + d^*(i)\bar{r}(i)$$

it is obtained $$w(i) = \hat{\bar{R}}^{-1}(i)\hat{\bar{p}}(i) = \lambda P(i)\hat{\bar{p}}(i-1) + P(i)\bar{r}(i)d^*(i) \quad (24)$$

Substituting (23) into (24) yields:

$$w(i) = w(i-1) + G(i)\zeta^*(i) \quad (25)$$

where the a priori estimation error is described by $\zeta(i) = d(i) - w^H(i)\bar{r}(i)$. Similar recursions for the interpolator are devised by using (12). The estimate $$\hat{R}_u(i)$$

can be obtained through $$\hat{R}_u(i) = \sum_{j=1}^{i} \lambda^{i-j} u(j) u^H(j)$$

and can be alternatively written as $$\hat{R}_u(i) = \lambda \hat{R}_u(i-1) + u(i)u^H(i).$$

To avoid the inversion of $$\hat{R}_u(i)$$

the matrix inversion lemma is used and again for convenience of computation it is defined $$P_u(i) = \hat{R}_u^{-1}(i)$$

and the Kalman gain vector $G_{all\ (i)\ as}$:

$$G_u(i) = \frac{\lambda^{-1} P_u(i-1) u(i)}{1 + \lambda^{-1} u^H(i) P_u(i-1) u(i)} \quad (26)$$

and thus rewriting (26) as $$P_u(i) = \lambda^{-1} P_u(i-1) - \lambda^{-1} G_u(i) u^H(i) P_u(i-1) \quad (27)$$

By processing in a similar approach to the one taken to obtain (25) it is arrived at $$v(i) = v(i-1) + G_u(i)\zeta^*(i) \quad (28)$$

The RLS algorithm for the proposed structure trades off a computational complexity of $O(M^2)$ against two RLS algorithms operating in parallel, with complexity $O((M/L)^2)$ and $O(N_I^2)$, respectively. Because $N_I$ is small ($N_I \ll M$ and $M/L \ll M$, as $M/L$ and $N_I$ do not scale with system size) the computational advantage of the RLS combined with the INT structure is rather significant. It should be remarked that fast RLS versions of the proposed scheme are possible due to the absence of the time-shifting properties required by those fast techniques. In Table III, it is illustrated the pseudo-code of the algorithm described here.

TABLE III

RLS iterative algorithm for the design of proposed reduced-rank filtering scheme.
Algorithm III:

Initialize $w(0) = [0 \ldots 0]^T$ and $v(0) = [1\ 0 \ldots 0]^T$
Choose parameters B, L and forgetting factor $\lambda$

TABLE III-continued

RLS iterative algorithm for the design of proposed reduced-rank filtering scheme.
Algorithm III:

for each time instant (i) do
Compute M × 1 vector $r_I(i) = V^H(i)r(i) = \mathfrak{R}_o(i)v^*(i)$
Obtain M/L × 1 vectors $\bar{r}_b(i) = D_b r_I(i)$ for the B branches
Select $D_b$ that minimizes $|\zeta_b(i)|^2$ ($D_b$ becomes D(i))
Obtain $\bar{r}(i)$ and compute P(i) and G(i)
Obtain u(i) and compute $P_u(i)$ and $G_u(i)$
Compute $v(i) = v(i-1) + G_u(i)\zeta^*(i)$ and $w(i) = w(i-1) + G(i)\zeta^*(i)$
Reduced-rank sample estimate: $d(i) = w^H(i)r(i)$

The invention claimed is:

1. A system for adaptive reduced-rank parameter estimation using an adaptive decimation and interpolation scheme comprising:
    (a) a first finite impulse response (FIR) interpolator filter with $N_I$ weights at the front-end of the system, represented by the $N_I \times 1$ parameter vector $v(i)=[v_0^{(i)} \ldots v_{N_I}^{(i)}]^T$ that filters the input discrete-time signal r(i) with dimension M×1 and results in the interpolated received vector $r_I(i)$ with dimension M×1;
    (b) an adaptive decimation unit that has B parallel branches with appropriate decimation patterns represented by the M/L×M matrix $D_b$ that is responsible for the dimensionally reduction of the M×1 interpolated received vector $r_I(i)$, resulting in B reduced-rank decimated vectors $\bar{r}_b(i)$ with dimension M/L×1;
    (c) a signal selection scheme that chooses the decimation pattern $D_b$ that minimizes the squared norm of the error signal defined by $e_b(i)=d(i)-w^H(i)\bar{r}_b(i)$, where d(i) is a reference signal, the selection scheme utilizes the corresponding M/L×1 vector $\bar{r}_b(i)$ that yields the minimum $|e_b(i)|^2$ r(i) for the remaining signal processing; and
    (d) a second FIR filter with M/L weights, denoted reduced-rank filter $w(i)=[w_0^{(i)} \ldots w_{M/L}^{(i)}]^T$, that is responsible for the estimation of the desired signal, the system computes the inner product of w(i) with r(i) in order to yield the parameter estimation for time instant (i) given by $d_{est}(i) = w^H(i)r(i)$.

2. The system of claim 1, wherein an optimal decimation scheme that is based on the extensive search of all possible decimation patterns and corresponds to B=(MI)/((M−M/L)I) decimation patterns and branches.

3. The system of claim 1, wherein a suboptimal decimation scheme that is based on B independent and random selected decimation patterns.

4. The system of claim 1, wherein a suboptimal decimation scheme that is based on B pre-stored decimation patterns that correspond to a uniform scheme whose index of samples chosen at each row m is shifted by one position for each branch b.

5. The system of claim 1, wherein interpolator v(i) and reduced-rank w(i) filters are computed through a joint optimization of both parameter vectors.

6. The system of claim 1, wherein the process of converting analog to discrete-time signals is accomplished by standard analog-to-digital converters.

7. The system of claim 5, wherein the joint parameter optimization of the interpolator v(i) and reduced-rank w(i) filters is carried out by standard adaptive estimation approaches such as the LMS and the RLS.

8. A method for processing discrete-time signals organized into data vectors and reducing the number of elements for parameter estimation comprising the steps of
    (a) pre-filtering the observed data vector with dimension M×1 with a first time-varying FIR filter with order $N_I$−1;
    (b) discarding M−M/L samples of the M×1 pre-filtered vector in B different ways, yielding B candidate vectors with reduced dimension M/L;
    (c) computing the inner product of the B candidate vectors $\bar{r}_b(i)$ with a second time-varying FIR filter w(i), with M/L weights, yielding B candidate scalar estimates $d_b(i) = w^H(i)\bar{r}_b(i)$;
    (d) calculating the B error signals $e_b(i)$ between the desired signal d(i) and the B candidates $d_{est\_b}(i)$;
    (e) selecting the error signal $e_b(i)$ with smallest magnitude and its corresponding candidate vector $r\_bar_b(i)$, the selected candidate vector $r\_bar_b(i)$ and error $e_b(i)$ become the vector $\bar{r}(i)$ and the error e(i) to be processed, respectively;
    (f) computing the inner product of the selected vector r(i) with the second time-varying FIR filter with M/L weights, which correspond to the desired signal estimate $d_{est}(i) = w^H(i)\bar{r}_b(i)$; and
    (g) adjusting the weights of the first and second time-varying FIR filters with a joint optimization procedure.

9. The method of claim 8, wherein the step of adaptively processing the received signals comprises of collecting, storing the samples in vectors and matrices and performing standard mathematical operations such as additions, multiplications, subtractions and divisions.

10. The method of claim 8, wherein the step of pre-processing the received signals comprises the steps of:
    (a) analog-to-digital converting;
    (b) down converting the received signals to baseband; and
    (c) applying a filter matched to the pulse used in the application to the converted received signals.

11. The method of claim 8, further comprising the step of creating a data vector from snapshots of the received signals over time.

* * * * *

UNITED STATES PATENT AND TRADEMARK OFFICE
CERTIFICATE OF CORRECTION

| | | |
|---|---|---|
| PATENT NO. | : 7,680,266 B2 | Page 1 of 1 |
| APPLICATION NO. | : 11/427471 | |
| DATED | : March 16, 2010 | |
| INVENTOR(S) | : Caiado de Lamare et al. | |

It is certified that error appears in the above-identified patent and that said Letters Patent is hereby corrected as shown below:

Column 11,

Lines 27 and 28, "dimensionally" should read --dimensionality--;

Line 36, "r(i)" should read --as r(i)--.

Signed and Sealed this
Fifth Day of July, 2011

David J. Kappos
*Director of the United States Patent and Trademark Office*